A. McDONALD.
Pipe-Tongs.
No. 168,166.
Patented Sept. 28, 1875.
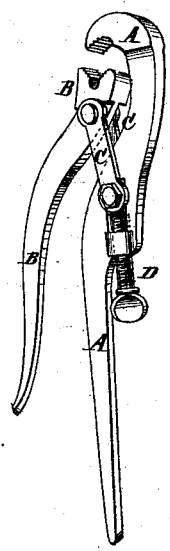
WITNESSES:
INVENTOR:
A. McDonald
BY
ATTORNEYS.

UNITED STATES PATENT OFFICE.

ALEXANDER McDONALD, OF HALIFAX, CANADA.

IMPROVEMENT IN PIPE-TONGS.

Specification forming part of Letters Patent No. 168,166, dated September 28, 1875; application filed August 28, 1875.

*To all whom it may concern:*

Be it known that I, ALEXANDER McDONALD, of Halifax, in the county of Halifax, Province of Nova Scotia, Dominion of Canada, have invented a new and useful Improvement in Pipe-Tongs, of which the following is a specification:

The figure is a perspective view of my improved pipe-tongs.

The object of this invention is to furnish an improved device for grasping pipes, rods, studs, &c., for screwing them into and out of place, and which shall be simple in construction, convenient in use, and effective in operation, grasping the pipe firmly and holding it securely.

The invention consists in the combination of the pivoted bars with the hooked lever and the notched lever; and in the combination of the set-screw with the pivoted bars, the hooked lever, and the notched lever, as hereinafter fully described.

B and C are the levers of the tongs. The forward end of the lever B is bent into hook form, and has corrugations or teeth formed upon its concave surface. The forward end of the lever C has a V-shaped, flaring, or rounded notch formed in it, the inclined sides of which are corrugated or toothed. To the opposite sides of the forward end of the notched lever C are pivoted the forward ends of two bars, A, the rear ends of which are pivoted to the opposite sides of the hooked lever B, at some distance from its forward end. The pivoting-bolt at the rear ends of the bars A passes through a longitudinal slot in the lever B, and its rearward movement is limited by a set-screw, D, that passes in through a screw-hole in said lever B, in line with the said slot.

The set-screw D enables the tongs to be adjusted to operate upon various sizes of pipes.

By this construction a great advantage of leverage is given to the tongs, so that they will grasp the pipe or other object firmly and hold it securely.

Having thus described my invention, I claim as new and desire to secure by Letters Patent—

1. The combination of the pivoted bars A with the hooked lever B and the notched lever C, substantially as herein shown and described.

2. The combination of the set-screw D with the bars A, the hooked lever B, and the notched lever C, substantially as herein shown and described.

ALEXR. McDONALD.

Witnesses:
RUFUS BAYERS,
JAS. A. MACDONALD.